United States Patent
Girard et al.

(10) Patent No.: US 9,166,419 B2
(45) Date of Patent: Oct. 20, 2015

(54) INTELLIGENT CHARGING AND DISCHARGING SYSTEM FOR PARALLEL CONFIGURATION OF SERIES CELLS WITH SEMICONDUCTOR SWITCHING

(71) Applicants: Robert Bosch GmbH, Stuttgart, MI (US); Samsung SDI Co., Ltd., Yongin-si, Gyeonggi-do (KR)

(72) Inventors: Gregory J. Girard, Clio, MI (US); Nick Karditsas, Lake Orion, MI (US); John Collier, Orion, MI (US)

(73) Assignee: Robert Bosch GmbH, Stuttgart (DE)

( * ) Notice: Subject to any disclaimer, the term of this patent is extended or adjusted under 35 U.S.C. 154(b) by 428 days.

(21) Appl. No.: 13/663,679

(22) Filed: Oct. 30, 2012

(65) Prior Publication Data
US 2013/0106357 A1    May 2, 2013

Related U.S. Application Data (60) Provisional application No. 61/553,695, filed on Oct. 31, 2011.

(51) Int. Cl.
*H02J 7/00* (2006.01)
*B60L 11/18* (2006.01)
*H01M 10/44* (2006.01)

(52) U.S. Cl.
CPC .......... *H02J 7/0026* (2013.01); *B60L 11/1853* (2013.01); *B60L 11/1864* (2013.01);
(Continued)

(58) Field of Classification Search
CPC ...... H02J 7/1423; H02J 7/0024; Y02E 60/12; Y02T 10/7005; Y02T 10/7055; B60L 11/18
USPC .................................. 320/126, 127, 128
See application file for complete search history.

(56) References Cited

U.S. PATENT DOCUMENTS 4,309,644 A * 1/1982 Reimers et al. ............... 318/139
5,316,868 A * 5/1994 Dougherty et al. ............... 429/9
(Continued)

FOREIGN PATENT DOCUMENTS

DE  102007047713    4/2009
EP     1837944 A2 *  9/2007
(Continued)

OTHER PUBLICATIONS

Notification of Transmittal of the International Search Report and the Written Opinion of the International Searching Authority, or the Declaration dated Apr. 17, 2013 in reference to PCT/US2012/062568 (13 pgs).

*Primary Examiner* — M'Baye Diao
(74) *Attorney, Agent, or Firm* — Maginot Moore & Beck LLP (57) ABSTRACT

A battery pack for an electric vehicle includes a first battery, a second battery, and a load arranged in parallel. A first semiconductor switching module is arranged in series with the first battery, and to selectively allow current flow from the first battery to the load and from the load to the first battery. A second semiconductor switching module is arranged in series with the second battery, and to selectively allow current flow from the second battery to the load and from the load to the second battery. A battery control module stores at least one of charge data and usage data corresponding to the first battery and the second battery, and selectively turns on and off the first semiconductor switching module and the second semiconductor switching module based on at least one of the charge data and the usage data.

18 Claims, 6 Drawing Sheets

(52) U.S. Cl.
CPC ......... *B60L11/1866* (2013.01); *B60L 11/1874* (2013.01); *B60L 11/1875* (2013.01); *H01M 10/441* (2013.01); *H02J 7/0013* (2013.01); *H02J 7/0068* (2013.01); *B60L 2240/545* (2013.01); *B60L 2240/547* (2013.01); *B60L 2240/549* (2013.01); *H02J 2007/0067* (2013.01); *Y02T 10/7005* (2013.01); *Y02T 10/7055* (2013.01); *Y02T 10/7061* (2013.01)

(56) References Cited

U.S. PATENT DOCUMENTS

| | | | |
|---|---|---|---|
| 5,631,534 | A | 5/1997 | Lewis |
| 5,760,570 | A | 6/1998 | Nagai et al. |
| 5,804,973 | A | 9/1998 | Shinohara et al. |
| 5,883,495 | A | 3/1999 | Smith et al. |
| 5,977,751 | A | 11/1999 | Blessing et al. |
| 6,130,813 | A | 10/2000 | Kates et al. |
| 6,150,795 | A | 11/2000 | Kutkut et al. |
| 6,157,165 | A | 12/2000 | Kinoshita et al. |
| 6,204,633 | B1 | 3/2001 | Kitagawa |
| 6,437,538 | B1 | 8/2002 | Tsurumi et al. |
| 6,741,065 | B1 | 5/2004 | Ishii et al. |
| 6,977,513 | B2 | 12/2005 | Matsunaga |
| 7,245,108 | B2 | 7/2007 | Chertok et al. |
| 7,304,402 | B2 | 12/2007 | Osawa et al. |
| 7,352,154 | B2 | 4/2008 | Cook |
| 7,400,114 | B2 * | 7/2008 | Anzawa et al. ............... 320/119 |
| 7,463,009 | B2 | 12/2008 | Chang et al. |
| 7,535,200 | B2 | 5/2009 | Chang et al. |
| 7,737,660 | B2 | 6/2010 | Yun |
| 7,737,664 | B2 | 6/2010 | Matsunaga |
| 7,956,488 | B2 | 6/2011 | Kobayashi et al. |
| 8,008,890 | B2 | 8/2011 | Lee et al. |
| 2004/0155627 | A1 | 8/2004 | Stanesti et al. |
| 2009/0066291 | A1 | 3/2009 | Tien et al. |
| 2009/0325056 | A1 | 12/2009 | Greening et al. |
| 2010/0079108 | A1 | 4/2010 | Monden et al. |
| 2010/0315043 | A1 | 12/2010 | Chau |
| 2011/0025124 | A1 | 2/2011 | Brabec |
| 2011/0025125 | A1 | 2/2011 | Brabec |
| 2011/0169448 | A1 | 7/2011 | Ichikawa |
| 2012/0025768 | A1 * | 2/2012 | Nakano et al. ............... 320/116 |
| 2012/0293112 | A1 | 11/2012 | Suzuki |

FOREIGN PATENT DOCUMENTS

| | | |
|---|---|---|
| JP | 2001111403 A | 4/2001 |
| JP | 2005168259 A | 6/2005 |
| WO | WO2010087608 | 8/2010 |
| WO | WO2011/074390 A1 | 6/2011 |

* cited by examiner

INTELLIGENT CHARGING AND DISCHARGING SYSTEM FOR PARALLEL CONFIGURATION OF SERIES CELLS WITH SEMICONDUCTOR SWITCHING

CROSS-REFERENCE TO RELATED APPLICATIONS

This application claims the benefit of U.S. Provisional Application No. 61/553,695, filed on Oct. 31, 2011 and is related to U.S. patent application Ser. No. 13/663,686, filed on Oct. 30, 2012. The entire disclosures of the above applications are incorporated herein by reference.

FIELD

The present disclosure relates to semiconductor switching of batteries within a battery pack of an electric vehicle.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Battery systems may be used to provide power in a wide variety of applications. Exemplary transportation applications include hybrid electric vehicles (HEV), plug-in HEVs, electric vehicles (EV), heavy duty vehicles (HDV), and vehicles with 42-volt electrical systems. Exemplary stationary applications include backup power for telecommunications systems, uninterruptible power supplies (UPS), and distributed power generation applications.

Examples of the types of batteries that are used include nickel metal hydride (NiMH) batteries, lead-acid batteries, lithium batteries, lithium-ion batteries, and other types of batteries. A battery system may include a plurality of battery subpacks that are connected in series and/or in parallel. The battery subpacks may include a plurality of batteries that are connected in parallel and/or in series.

SUMMARY

A battery pack for an electric vehicle includes a first battery arranged in parallel with a load of the electric vehicle. A second battery is arranged in parallel with the first battery and the load. A first semiconductor switching module is arranged in series with the first battery, the first semiconductor switching module arranged to selectively allow current flow from the first battery to the load and from the load to the first battery. A second semiconductor switching module is arranged in series with the second battery, the second semiconductor switching module arranged to selectively allow current flow from the second battery to the load and from the load to the second battery. A battery control module stores at least one of charge data corresponding to respective charges of the first battery and the second battery and usage data corresponding to respective ones of the first battery and the second battery, and selectively turns on and off the first semiconductor switching module and the second semiconductor switching module based on at least one of the charge data and the usage data.

A method of operating a battery pack for an electric vehicle includes arranging a first battery in parallel with a load of the electric vehicle, arranging a second battery in parallel with the first battery and the load, arranging a first semiconductor switching module in series with the first battery to selectively allow current flow from the first battery to the load and from the load to the first battery, arranging a second semiconductor switching module in series with the second battery to selectively allow current flow from the second battery to the load and from the load to the second battery, storing at least one of charge data corresponding to respective charges of the first battery and the second battery and usage data corresponding to respective ones of the first battery and the second battery, and selectively turning on and off the first semiconductor switching module and the second semiconductor switching module based on the at least one of the charge data and the usage data.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

An electric vehicle is powered by a battery (i.e., a battery pack or system that includes a plurality of batteries or subpacks) according to the principles of the present disclosure. The batteries (i.e., cells) are connected in parallel with each other and a load (e.g., one or more electrically powered functions of the electric vehicle) to provide current and/or voltage to the load. Each of the batteries is arranged in series with, for example only, a semiconductor switching module such as one or more semiconductor devices arranged to allow bi-directional current flow to and/or from the batteries. For example, each of the semiconductor devices may be connected in parallel with one or more respective diodes. Accordingly, in a first state, each battery may be individually charged (e.g., via the load) via a respective one of the switching modules. Conversely, in a second state, each battery may be allowed to discharge (i.e., power the load) individually via the respective one of the switching modules. The semiconductor switching module is controlled to, for example only, balance respective charges of the batteries to increase battery charge retention and/or maintain uniform battery usage.

Figure 1:
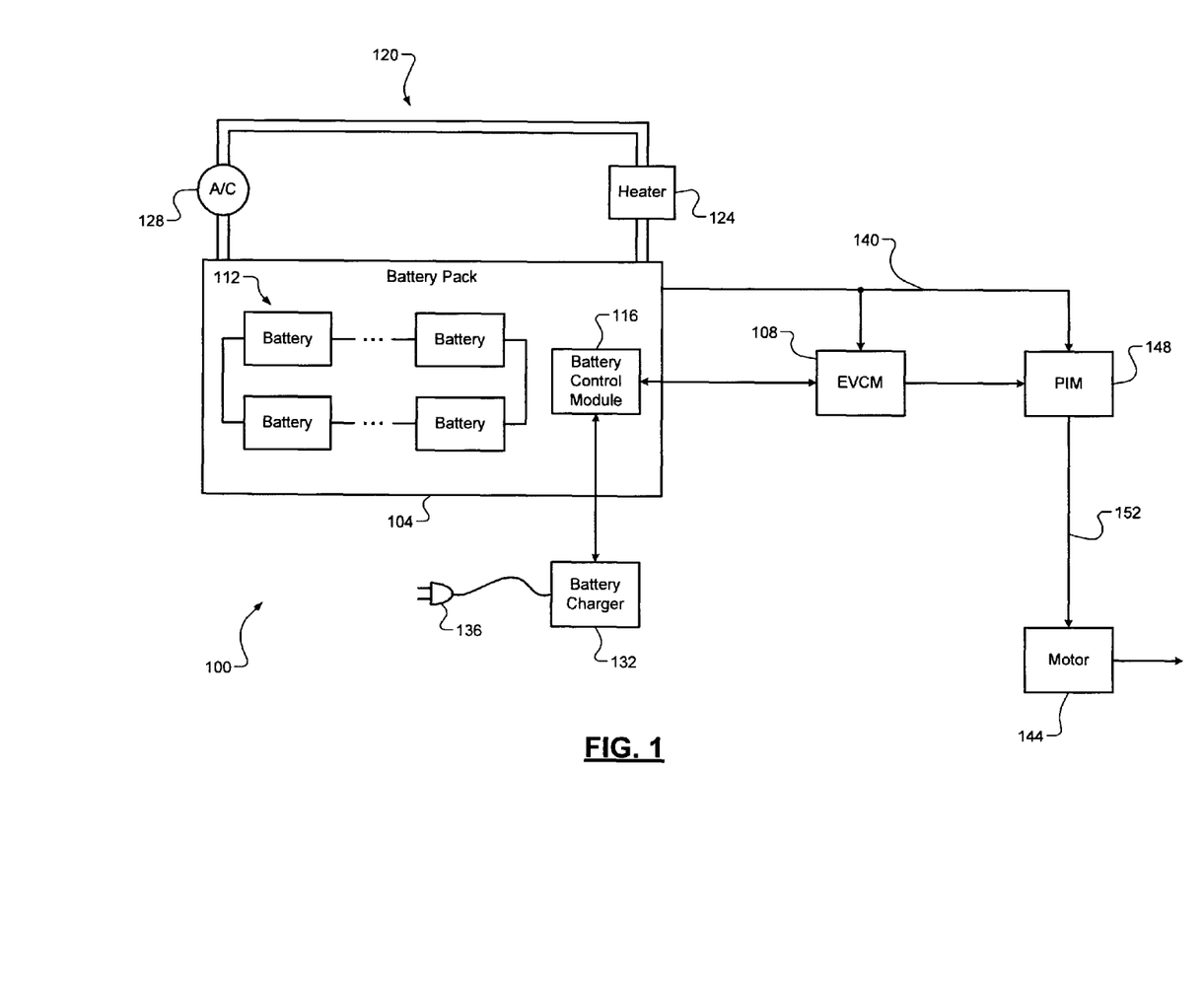
FIG. 1 is a functional block diagram of an electric vehicle according to the principles of the present disclosure.

Referring now to FIG. 1, an electric vehicle 100 includes a battery pack 104 and an electric vehicle control module (EVCM) 108. The battery pack 104 includes a plurality of batteries 112 and a battery control module 116. The battery control module 116 controls various functions of the battery pack 104 and monitors and collects various characteristics of the battery pack 104. For example, the battery control module 116 monitors characteristics including, but not limited to, voltage, current, and temperature associated with the battery pack 104. The battery control module 116 may determine performance variables of the battery pack 104 based on the characteristics. For example only, the battery control module 116 may estimate a state of charge (SOC) of the battery pack 104 based on the voltage, current, and temperature of the battery pack 104. The battery control module 116 may also determine an age of the battery pack 104 (e.g., ages of the batteries 112), and beginning of life (BOL) and/or end of life (EOL) information (and battery performance limitations associated with the BOL and/or EOL information) based on the age.

The battery control module 116 may initiate heating and/or cooling of the battery pack 104 based on the temperature. For example, a coolant system 120 may provide liquid coolant that flows through the battery pack 104 to heat and cool the battery pack 104. The coolant system 120 may include a heater 124 that heats the coolant when the temperature of the battery pack 104 is less than a low temperature threshold, and an air conditioner/compressor 128 that cools the coolant when the temperature of the battery pack 104 is greater than a high temperature threshold. Alternatively, instead of a compressor, the coolant system 120 may include any other coolant device suitable to chill the coolant, such as a thermoelectric cooler.

The battery control module 116 may communicate with a battery charger 132 (e.g., a battery charger of an electric or plug-in hybrid vehicle). The battery charger 132 charges the battery pack 104 and may include a user interface (not shown) for providing visual indications (e.g., via a display) of the condition of the battery pack 104 (e.g., the SOC of the battery pack 104). The battery charger 132 includes a plug 136 that interfaces with a power source (not shown) to provide charging power to the battery pack 104 via the battery charger 132.

The EVCM 108 communicates with the battery pack 104 and the battery control module 116 to control various functions of the vehicle 100. For example, the EVCM 108 receives voltage 140 from the battery pack 104. Conversely, the EVCM 108 receives information from the battery control module 116 related to, for example only, the monitored characteristics of the battery pack 104 and functions of the battery control module 116, the coolant system 120, and the battery charger 132.

The EVCM 108 controls a motor 144 of the vehicle 100 via a power inverter module (PIM) 148. The PIM 148 converts direct current (DC) voltage (e.g., the voltage 140) to alternating current (AC) voltage 152 and provides the AC voltage 152 to the motor 144. The motor 144 provides rotational force to drive wheels (not shown) of the vehicle 100. Alternatively, the motor 144 may be implemented as a DC motor, and the PIM 148 may be replaced by a motor controller that provides a DC voltage to the motor 144.

The batteries 112 are arranged in a parallel configuration within the battery pack 104. The battery control module 116 (and/or the EVCM 108 or other suitable components of the electric vehicle 100) implements semiconductor switching systems and methods according to the principles of the present disclosure to individually control charging and discharging of each of the batteries 112. For example, the battery control module 116 individually controls charging and discharging of the batteries 112 to increase charge retention of the batteries 112 and/or maintain uniform usage of each of the batteries 112.

Figure 2:
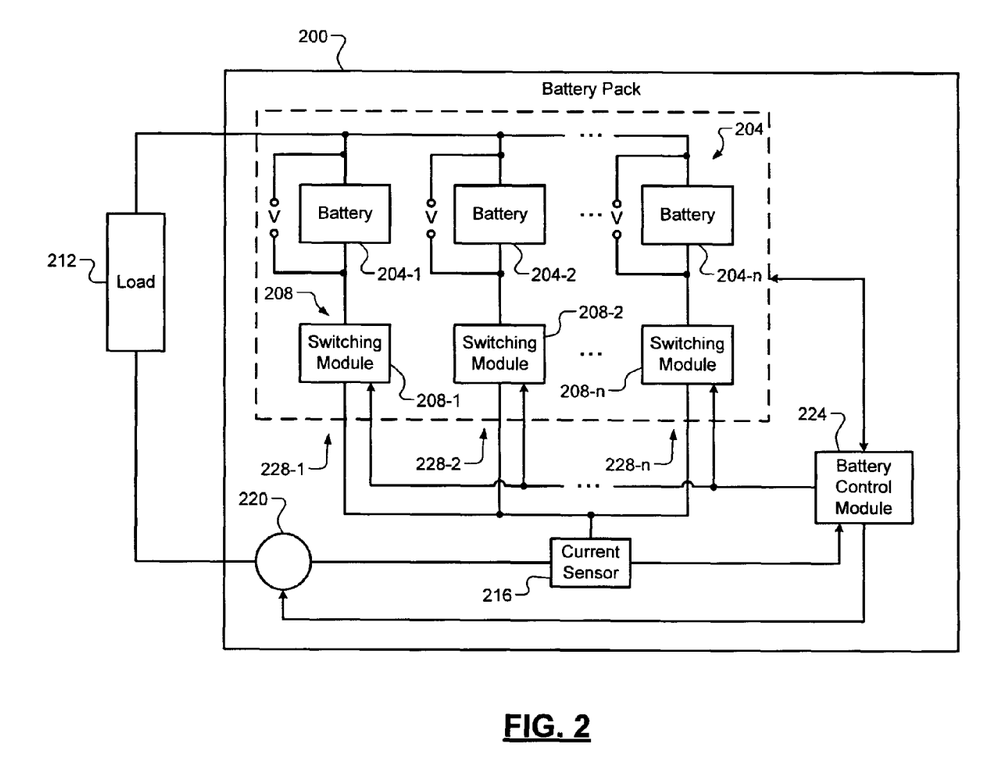
FIG. 2 is a functional block diagram of a battery pack according to the principles of the present disclosure.

Referring now to FIG. 2, a battery pack 200 according to the principles of the present disclosure includes batteries 204-1, 204-2, . . . , and 204-n, referred to collectively as batteries 204. Each of the batteries is connected in series with a corresponding one of semiconductor switching modules 208-1, 208-2, . . . , and 208-n, referred to collectively as switching modules 208. Although only one of the batteries 204 is shown in series with each of the switching modules 208, two or more of the batteries 204 can be connected in series with the respective one of the switching modules 208. The batteries 204 (and the corresponding switches 208) are connected in parallel with each other and a load 212. A current sensor 216 (e.g., a hall or shunt current sensor) is connected in series with the batteries 204, the switching modules 208, the load 212, and a contactor 220 (e.g., an air gap switch).

The switching modules 208 allow bi-directional current flow to and/or from respective ones of the batteries 204. For example, a battery control module 224 controls the switching modules 208, individually, to selectively charge the respective batteries 204 via the load 212, and to selectively discharge the respective batteries 204 to power the load 212. The battery control module 224 controls the switching modules 208 according to various characteristics of the batteries 204, the battery pack 200, the load 212, and/or any other characteristics of the electric vehicle 100. For example, the battery control module 224 monitors a current through the batteries 204 (e.g., using the current sensor 216) and/or respective voltages of the batteries 204 (e.g., via a high impedance voltage sensor or by calculating the voltage according to the sensed current). Respective polarities of the voltages and currents may be indicative of whether the batteries 204 are charging or discharging. The battery control module 224 selectively operates the switching modules 208 based in part on the current and/or the voltages, as well as the respective polarities. The battery control module 224 may also selectively operate the contactor 220 (i.e., open and close the contactor to, respectively, allow and interrupt current flow to and from the load 212).

Each of the batteries 204 and the respective one of the switching modules 208 corresponds to a different one of strings 228-1, 228-2, . . . , 228-n, referred to collectively as strings 228. For example, the string 228-1 includes the battery 204-1 and the switching module 208-1. The string 228-2 includes the battery 204-2 and the switching module 208-2. The string 228-n includes the battery 204-n and the switching module 208-n.

Figure 3A:
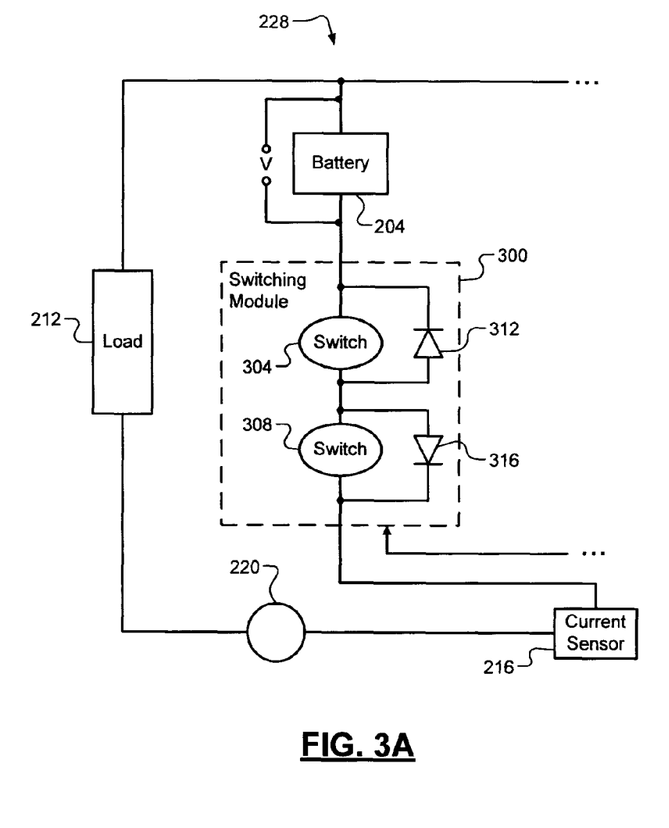
FIGS. 3A and 3B are functional block diagrams of example switching modules according to the principles of the present disclosure.
Figure 3B:
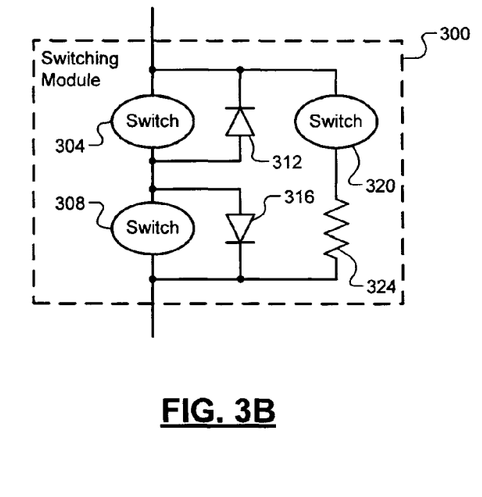

Referring now to FIGS. 3A and 3B, an example semiconductor switching module 300 is shown in detail. The switching module 300 includes a first semiconductor switch 304, a second semiconductor switch 308, a first diode 312, and a second diode 316. For example only, each of the first semiconductor switch 304 and the second semiconductor switch 308 may include any suitable transistor. The battery control module 224 as shown in FIG. 2 individually controls each of the semiconductor switches 304 and 308. The battery control module 224 selectively opens (i.e., turns OFF) and closes (i.e., turns ON) the semiconductor switches 304 and 308 to transition the battery 204 and the switching module 300 between respective states, including, for example only, a charge state, a discharge state, and/or a stop state.

In some implementations, the switching module 300 includes a pre-charge semiconductor switch 328 (e.g., any suitable transistor) and a pre-charge resistor 324 as shown in FIG. 3B. Accordingly, the switching module 300 may include a pre-charge state. The pre-charge switch 328 and resistor 324 can be implemented in any one or more of the switching modules 300. The battery control module 224 selectively initiates a pre-charge cycle corresponding to the pre-charge state (e.g., if a negative contactor of the battery pack 200 is closed). To operate the pre-charge cycle, the battery control module 224 opens (i.e., turns OFF) the switches 304 and 308, closes the negative contactor of the battery pack 200, and closes (i.e., turns ON) the pre-charge semiconductor switch 328. The pre-charge resistor 324 limits a current flowing through the switch 328 to a desired amount.

After a predetermined pre-charge time, the battery control module 224 opens (i.e., turns OFF) the switch 328 to transition from the pre-charge state to another one of the respective states. Further, during the pre-charge state, the battery control module 224 may open the contactor 220 to terminate pre-charging if either of the sensed current or sensed voltage is determined to be outside of a predetermined acceptable range.

For example only, after the pre-charge state, the battery control module 224 transitions to the discharge state. In the discharge state, the battery control module 224 turns the semiconductor switch 304 ON and the semiconductor switch 308 OFF, and current is able to flow from the battery 204 to the load 212 through the switching module 208 (i.e., through the semiconductor switch 304 and the diode 316). Accordingly, in the discharge state, the batteries 204 are used to provide power to the load 212. The amount of power is determined based on, for example, a number of the batteries 204 per string 228 (i.e., per series connection of one or more batteries 204 with one of the switching modules 300), and a number of the parallel batteries 204 that are active (i.e., that are in the discharge state).

While in the discharge state, the battery control module 224 continues to monitor current and/or voltage, and may selectively shut down one or more strings 228 (e.g., turn off all semiconductor switches corresponding to one or more of the batteries 204, and/or open the contactor 220) if the current and/or voltage are determined to be outside of one or more predetermined ranges. For example, if the current and/or voltage are outside of a first predetermined range, the battery control module 224 may simply shut down one or more of the batteries 204 (i.e., a switching module 300 corresponding to one of the batteries 204). Conversely, if the current and/or voltage are outside of a second predetermined range (e.g., that is greater than the first predetermined range), the battery control module 224 may open the contactor 220. Further, if fewer than all of the batteries 204 are in the discharge state, the battery control module 224 can transition additional ones of the batteries 204 and respective switching modules 300 to the discharge state to provide additional power to the load 212. Or, if one or more of the batteries 204 is not functioning properly, the corresponding switching module 300 can be turned OFF while remaining ones of the batteries 204 are still used to provide power to the load 212. In other words, while the battery control module 224 may open the contactor 220 to completely interrupt current flow to and from the batteries 204, the battery control module 224 may also simply turn ON and OFF individual ones of the switching modules 300.

If a sensed current and/or voltage corresponding to one of the batteries 204 changes polarity (e.g., from positive to negative or from negative to positive), the battery control module 224 transitions to the charge state. In the charge state, the battery control module 224 turns the semiconductor switch 304 OFF and the semiconductor switch 308 ON, and current is able to flow from the load 212 to the battery 204 through the switching module 300 (i.e., through the semiconductor switch 308 and the diode 312). Accordingly, in the charge state, the load 212 is used to charge the batteries 204. While in the charge state, the battery control module 224 continues to monitor current and/or voltage, and may selectively shut down one or more strings (e.g., turn off all semiconductor switches corresponding to one or more of the batteries 204, and/or open the contactor 220) if the current and/or voltage are determined to be outside of a first or second predetermined range. Further, if the sensed current and/or voltage again changes polarity (e.g., back from negative to positive, or from positive to negative), the battery control module 224 may determine that charging is complete and transition back to the discharge state.

In the stop state, the battery control module 224 opens (i.e., turns OFF) the contactor 220 to interrupt current to and from the batteries 204 if the current and/or voltage are outside of the second predetermined range. Further, the battery control module 224 may also simply turn OFF both of the semiconductor switches 304 and 308 in one or more of the switching modules 300 to interrupt current to and from selected ones of the batteries 204 if the current and/or voltage are outside of the first predetermined range.

In other implementations, the switching module 304 may only include a single semiconductor switch that is bi-directional instead of the first and second semiconductor switches 304 and 308. For example, in a first state (i.e., ON), the bi-directional semiconductor switch only allows current in a first direction. Conversely, in a second state (i.e., OFF), the bi-directional semiconductor switch only allows current in a second direction.

Referring to FIGS. 2, 3A, and 3B, the battery control module 224 controls each of the strings 228 individually to increase charge retention of the batteries 204 and/or maintain uniform usage of each of the batteries 204. For example only, the battery control module 224 stores usage data (e.g., in non-volatile memory) indicative of which of the strings 228 is used in the pre-charge state, which of the strings 228 is first activated in the discharge state, and/or which of the strings 228 should be first activated in a next discharge state.

For example, if the string 228-1 is being used in a first pre-charge state, the battery control module 224 may store data indicating that the string 228-1 was recently used for pre-charging. Accordingly, during a next pre-charge state, the battery control module 224 activates another one of the strings 228 (e.g., the string 228-2) during pre-charging instead of the string 228-1. Alternatively, if the string 228-1 is being used in the first pre-charge state, the battery control module 224 may instead store data indicating that another one of the strings (e.g., the string 228-2) is to be used for the next pre-charge state. Accordingly, the stored data may indicate which of the strings 228 not to use for the next pre-charge state, or which of the strings 228 to use for the next pre-charge state. In other implementations, the battery control module 224 may store data indicative of how many times each of the strings 228 has been used for pre-charging. For example, the battery control module 224 may increment a respective counter value each time a corresponding one of the strings 228 is used for pre-charging. Accordingly, the battery control module 224 may select the string 228 corresponding to a lowest number of pre-charges (i.e., the lowest counter value) for the next pre-charge state.

Similarly, the battery control module 224 may store data indicative of which of the strings 228 is activated first in a given discharge state. For example, as described above with respect to FIGS. 3A and 3B, the battery control module 224 may initially only activate one of the strings 228 in the discharge state. If additional power is needed, the battery control module 224 may than activate additional ones of the strings 228 to provide the additional power to the load 212. Accordingly, only one (e.g., the string 228-1) of the strings 228 may be activated in a first discharge state.

During a next discharge state, the battery control module 224 activates another one of the strings 228 (e.g., the string 228-2) first upon transitioning to the next discharge state instead of the string 228-1. Alternatively, if the string 228-1 activated first in the first discharge state, the battery control module 224 may instead store data indicating that another one of the strings (e.g., the string 228-2) is to be activated first in the next discharge state. Accordingly, the stored data may indicate which of the strings 228 not to activate first in the next discharge state, or which of the strings 228 to activate first in the next discharge state. In other implementations, the battery control module 224 may store data indicative of how many times each of the strings 228 has been activated first in previous discharge states. For example, the battery control module 224 may increment a respective counter value each time a corresponding one of the strings 228 is activated first in the discharge state. Accordingly, the battery control module 224 may select the string 228 corresponding to the lowest counter value to be activated first in the next discharge state. In other implementations, the battery control module 224 may always select the string 228 having the battery 204 with the highest charge for the next discharge state and/or the next pre-charge state.

Figure 4:
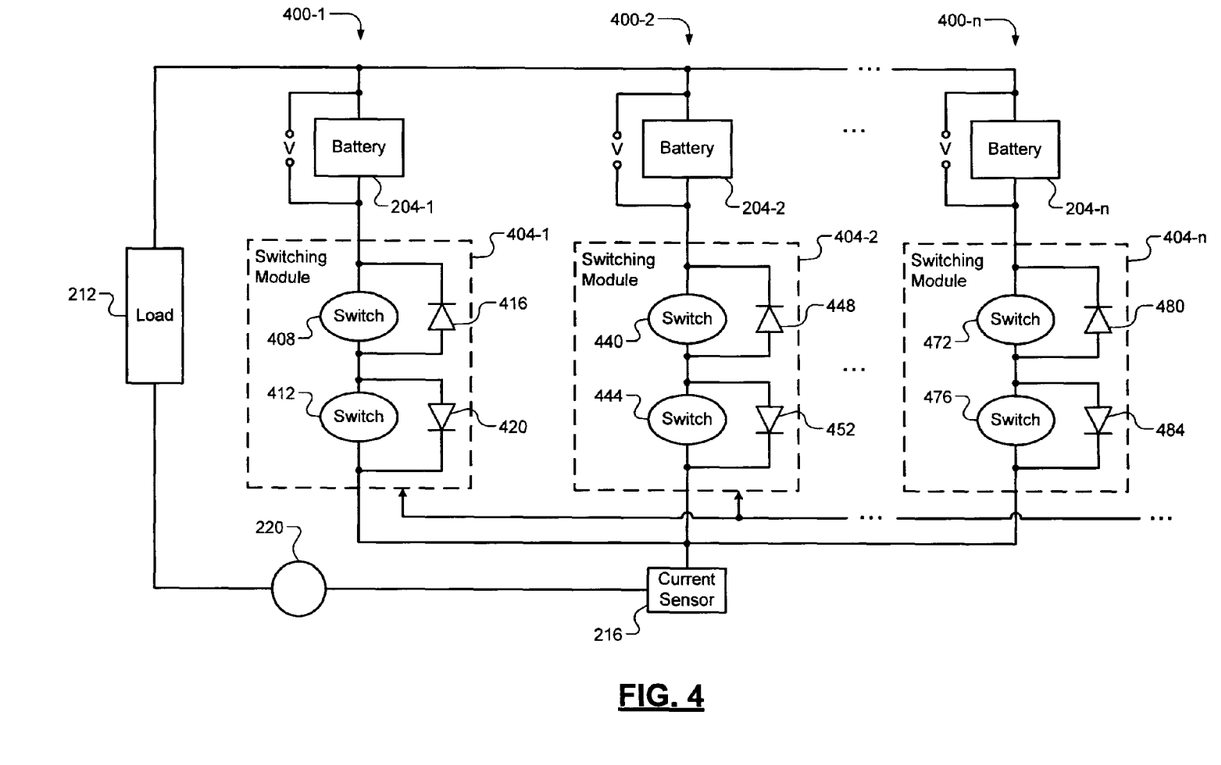
FIG. 4 is a functional block diagram of a plurality of example switching modules according to the principles of the present disclosure.

Referring now to FIG. 4, strings 400-1, 400-2, . . . , and 400-n, referred to collectively as strings 400, include example semiconductor switching modules 404-1, 404-2, . . . , and 404-n, respectively, referred to collectively as semiconductor switching modules 404. The switching module 404-1 includes semiconductor switches 408 and 412 and diodes 416 and 420. The switching module 404-2 includes semiconductor switches 440 and 444 and diodes 448 and 452. The switching module 404-n includes semiconductor switches 472 and 476 and diodes 480 and 484. The battery control module 224 (e.g., as shown in FIG. 2) individually controls each of the semiconductor switches 408, 412, 440, 444, 472, and 476 of the respective switching modules 404. For example, the battery control module 224 selectively opens (i.e., turns OFF) and closes (i.e., turns ON) the semiconductor switches 408, 412, 440, 444, 472, and 476 to transition the batteries 204 and the switching modules 404 between respective states, including, for example only, a pre-charge state, a charge state, a discharge state, and/or a stop state, as described above with respect to FIGS. 3A and 3B.

During the discharge state, the battery control module 224 may selectively activate individual ones of the strings 400 as described above, and/or may activate the strings 400 based on relative charges of the batteries 204. For example, the battery control module 224 activates one of the strings 400 (e.g., the string 400-1) first upon transitioning to the discharge state. Subsequently, the battery control module 224 may activate another one of the strings 400 (e.g., the string 400-2) to provide additional power to the load 212, and/or may deactivate the string 400-1 and activate a different one of the strings 400 (e.g., the string 400-2) to provide the same amount of power to the load 212.

For example, if the battery control module 224 determines that additional power is needed and fewer than all of the strings 400 are activated, the battery control module 224 activates additional ones of the strings 400. For example only, if the string 400-1 is activated first in the discharge state, the battery control module 224 may activate the string 400-2 second in the discharge state to provide additional power to the load 212. The battery control module 224 may select which of the strings 400 to activate second as described above with respect to FIGS. 3A and 3B. For example, the battery control module 224 may select the string 400 having a lowest counter value (i.e., corresponding to number of times used in previous discharge states) to activate second in the current discharge state.

Conversely, during any discharge state, the battery control module 224 may deactivate a first activated one of the strings 400 (e.g., the string 400-1) and instead activate another one of the strings 400 (e.g., the string 400-2). For example, the battery control module 224 monitors respective charges of each of the batteries 204. The battery control module 224 may store charge data corresponding to the respective charges, including, but not limited to, an average charge of all of the batteries 204, an average charge of all batteries 204 in currently deactivated strings 400, and/or highest and lowest charges of the batteries 204.

The battery control module 224 also monitors the charges of the batteries 204 in currently activated ones of the strings 400 and deactivates and activates the strings 400 accordingly. For example, if the string 401-1 is activated in the discharge state and the charge of the battery 204-1 decreases below a charge threshold, the battery control module 224 deactivates the string 400-1 and then activates the string 400-2 to continue providing power to the load 212. For example only, the charge threshold may be based on a predetermined minimum charge (e.g., a charge percentage), a predetermined percentage less than the average charge of all of the batteries 204 or the average charge of the deactivated ones of the batteries 204, a predetermined percentage less than a lowest charge or a highest charge of the deactivated ones of the batteries 204, and/or any other suitable relationship between the charge of the battery 204-1 and the charges of all of the batteries 204. In some implementations, the battery control module 224 transitions to the one of the strings 400 having the battery 204 with the highest charge.

To transition from the activated string 400-1 to another one of the strings 400 (e.g., the string 400-2), the battery control module 224 turns ON the switch 440. Accordingly, the switches 408 and 440 are both ON and power is provided to the load 212 by both of the batteries 204-1 and 204-2. Then, the battery control module 224 turns OFF the switch 408. In other words, power is provided to the load 212 uninterrupted during the transition from the string 400-1 to the string 400-2.

The battery control module 224 may also activated additional ones of the strings 400 if current provided by activated ones of the strings 400 is greater than a current threshold (e.g., if the current provided by an activated one of the strings 400 is greater than a predetermined percentage of the total current capable of being provided by the string). For example, if the string 400-1 is activated and the current is greater than the current threshold, the battery control module 224 also activates the string 400-2 (or, for example only, the one of the strings 400 having the battery 204 with the highest charge). If the current is still greater than the current threshold, the battery control module 224 may continue to activate additional ones of the strings 400 until the current is less than the current threshold.

Conversely, in the charge state, the battery control module 224 transitions the strings 400 to the charge state based on which of the batteries 204 has the lowest charge. For example, if the battery 204-1 has the lowest charge, the battery control module 224 first transitions the string 400-1 to the charge state. In other words, the battery control module 224 turns OFF the switch 408 and turns ON the switch 412 to allow current to flow from the load 212 to the battery 204-1 via the switching module 404-1. The battery control module 224 continues to operate the string 400-1 until the charge of the battery 204-1 is a predetermined amount greater than a lowest charge of remaining ones of the batteries 204. Then, the battery control module 224 turns OFF the switch 412 and transitions the one of the strings 400 having the battery 204 with the lowest charge to the charge state. For example, if the battery 204-2 has the lowest charge of the batteries 204, the battery control module 224 turns OFF the switch 412 and turns ON the switch 444 to charge the battery 204-2. In some implementations, the battery control module 224 may operates multiple ones of the strings 400 to the charge state at the same time.

Figure 5:
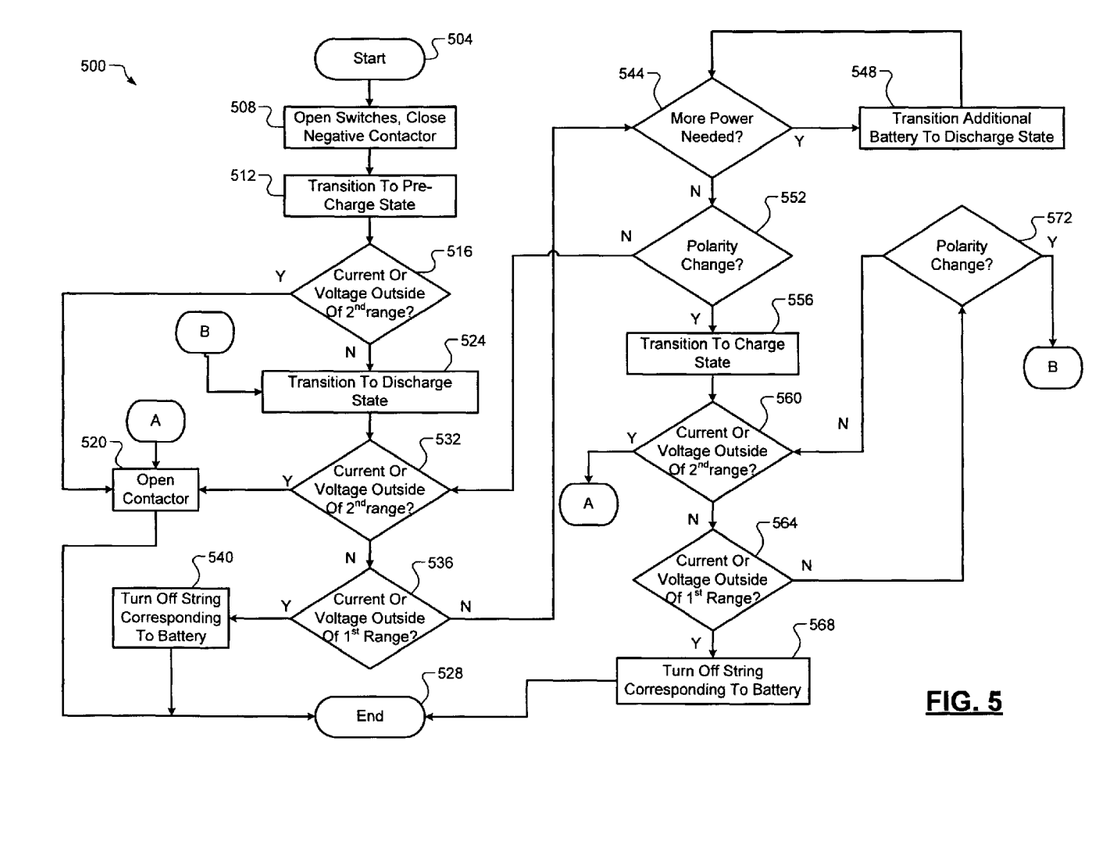
FIG. 5 illustrates an example battery control method according to the principles of the present disclosure.

Referring now to FIG. 5, an example battery control method 500 begins at 504. At 508, the method 500 opens charging and discharging semiconductor switches and closes a negative contactor of a battery pack. At 512, the method 500 closes a pre-charge semiconductor switch. In other words, the method 512 transitions to a pre-charge state. At 516, the method 500 determines whether a current and/or a voltage corresponding to a battery is outside of a second predetermined range. If true, the method 500 continues to 520. If false, the method continues to 524. At 520, the method 500 opens a contactor and transitions to a stop state, and ends at 528.

At 524, the method 500 transitions the battery to a discharge state after a predetermined per-charge time. At 532, the method 500 determines whether the current and/or voltage corresponding to the battery is outside of the second predetermined range. If true, the method 500 continues to 520. If false, the method continues to 536. At 536, the method 500 determines whether the current and/or voltage corresponding to the battery is outside of a first predetermined range. If true, the method 500 continues to 540. If false, the method 500 continues to 544. At 540, the method 500 turns off a string corresponding to the battery and ends at 528. At 544, the method 500 determines whether more power is needed. If true, the method 500 continues to 548. If false, the method 500 continues to 552. At 548, the method 500 transitions one or more additional batteries to the discharge state.

At 552, the method 500 determines whether a polarity of the current and/or voltage changes. If true, the method 500 continues to 556. If false, the method 500 continues to 532. At 556, the method 500 transitions to a charge state. At 560, the method 500 determines whether the current and/or voltage corresponding to the battery is outside of the second predetermined range. If true, the method 500 continues to 520. If false, the method continues to 564. At 564, the method 500 determines whether the current and/or voltage corresponding to the battery is outside of the first predetermined range. If true, the method 500 continues to 568. If false, the method 500 continues to 572. At 568, the method 500 turns off a string corresponding to the battery and ends at 528. At 572, the method 500 determines whether the polarity changes. If true, the method 500 continues to 524. If false, the method 500 continues to 560.

Figure 6:
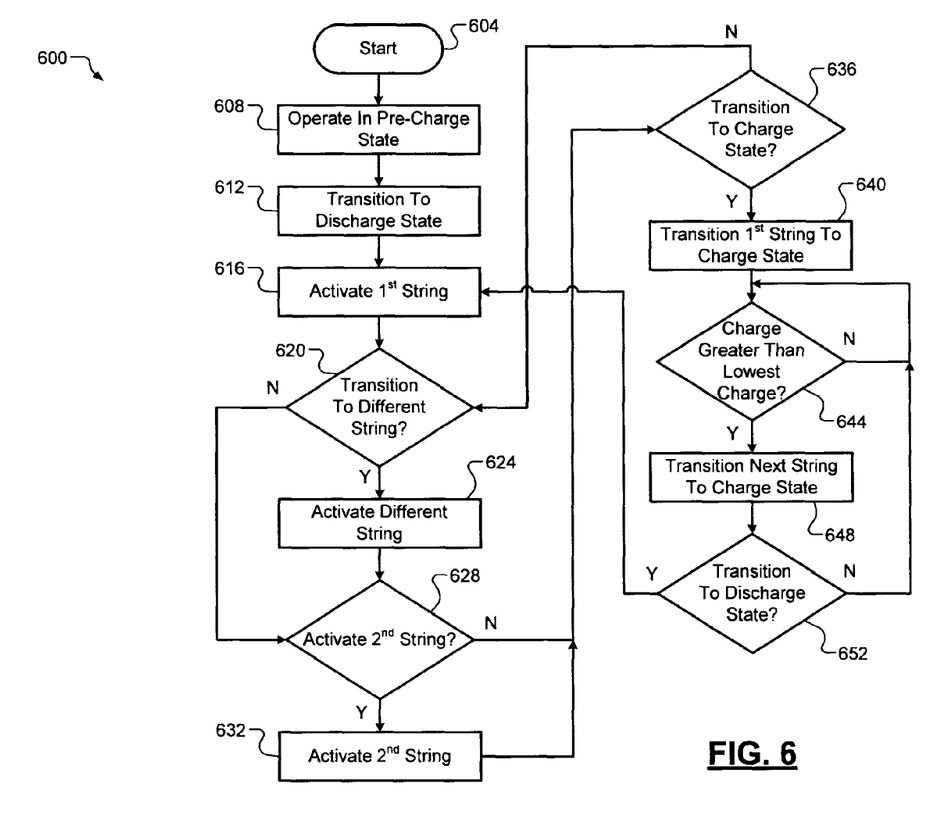
FIG. 6 illustrates another example battery control method according to the principles of the present disclosure.

Referring now to FIG. 6, another example battery control method 600 begins at 604. At 608, the method 600 operates in a pre-charge state. For example, the method 600 selects a battery for pre-charging based on stored data corresponding to usage of batteries in previous pre-charge states. At 612, the method 600 transitions to a discharge state after a predetermined pre-charge time. At 616, the method 600 activates a first string based on stored data corresponding to usage of the batteries in previous discharge states. At 620, the method 600 determines whether to transition to a different string (e.g., based on a charge of the battery in the activated string). If true, the method 600 continues to 624 and activates the different string based on the stored data. If false, the method 600 continues to 628.

At 628, the method 600 determines whether to activate a second string (e.g., to provide additional power and/or to reduce current provided by the activated string). If true, the method 600 continues to 632. If false, the method 600 continues to 636. At 632, the method 600 activates a second string based on the stored data. At 636, the method 600 determines whether to transition to a charge state (e.g., based on whether a current provided to the load changes polarity). If true, the method 600 continues to 640. If false, the method 600 continues to 620.

At 640, the method 600 transitions a first one of the strings to the charge state. For example, the method 600 transitions the string having the battery with the lowest charge to the charge state. At 644, the method 600 determines whether the charge of the battery being charged is a predetermined amount greater than a lowest charge of one of the remaining batteries. If true, the method 600 continues to 648. If false, the method 600 continues to 644. At 648, the method 600 transitions a next string having the battery with the lowest charge to the charge state. At 652, the method 600 determines whether to transition to the discharge state. If true, the method 600 continues to 616. If false, the method 600 continues to 644.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module and/or circuit may refer to, be part of, or include an Application Specific Integrated Circuit (ASIC); a discrete circuit; an integrated circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be partially or fully implemented by one or more computer programs executed by one or more processors. The computer programs include processor-executable instructions that are stored on at least one non-transitory tangible computer readable medium. The computer programs may also include and/or rely on stored data. Non-limiting examples of the non-transitory tangible computer readable medium include nonvolatile memory, volatile memory, magnetic storage, and optical storage.

What is claimed is:

1. A battery pack for an electric vehicle, comprising:
a first battery arranged in parallel with a load of the electric vehicle;
a second battery arranged in parallel with the first battery and the load;
a first semiconductor switching module arranged in series with the first battery, the first semiconductor switching module being configured to selectively allow current flow from the first battery to the load and from the load to the first battery;
a second semiconductor switching module arranged in series with the second battery, the second semiconductor switching module being configured to selectively allow current flow from the second battery to the load and from the load to the second battery; and
a battery control module configured to:
store charge data corresponding to respective charges of the first battery and the second battery;
store usage data corresponding to respective ones of the first battery and the second battery, the usage data including at least one of past usage states and subsequent usage states of at least one of the first battery and the second battery;
selectively turn on and off the first semiconductor switching module and the second semiconductor switching module based on the charge data; and
selectively turn on and off the first semiconductor switching module and the second semiconductor switching module based on.

2. The battery pack of claim 1, wherein:
the charge data includes at least one of a lowest charge of the respective charges of the first battery and the second battery, a highest charge of the respective charges of the first battery and the second battery, and an average of the respective charges of the first battery and the second battery.

3. The battery pack of claim 2, the battery control module being further configured to:
in a charge state, turn on the first semiconductor switching module to charge the first battery before turning on the second semiconductor switching module if the first battery has the lowest charge.

4. The battery pack of claim 3, the battery control module being further configured to:
in the charge state, turn off the first semiconductor switching module and turns on the second semiconductor switching module to charge the second battery if the charge of the first battery increases to a predetermined amount greater than the charge of the second battery.

5. The battery pack of claim 2, the battery control module being further configured to:
in a discharge state, turn on the first semiconductor switching module to provide power to the load from the first battery before turning on the second semiconductor switching module if the first battery has the highest charge.

6. The battery pack of claim 5, the battery control module being further configured to:
in the discharge state, turn off the first semiconductor switching module and turns on the second semiconductor switching module to provide power to the load from the second battery if the charge of the first battery decreases below a predetermined threshold.

7. The battery pack of claim 1, wherein:
the usage data includes at least one of i) a number of times the first battery was used in a pre-charge state, ii) a number of times the second battery was used in the pre-charge state, iii) which of the first battery and the second battery to use in a next pre-charge state, iv) which of the first battery and the second battery not to use in the next pre-charge state, v) a number of times the first battery was used first in a discharge state, vi) a number of times the second battery was used first in the discharge state, vii) which of the first battery and the second battery to use first in a next discharge state, and viii) which of the first battery and the second battery not to use in the next discharge state.

8. The battery pack of claim 7, the battery control module being further configured to:
transition one of the first semiconductor switching module and the second semiconductor switching module to the pre-charge state based on the usage data.

9. The battery pack of claim 7, the battery control module being further configured to:
in the discharge state, turn on the first semiconductor switching module to provide power to the load from the first battery before turning on the second semiconductor switching module based on the usage data.

10. A method of operating a battery pack for an electric vehicle, the method comprising:
arranging a first battery in parallel with a load of the electric vehicle;
arranging a second battery in parallel with the first battery and the load;
arranging a first semiconductor switching module in series with the first battery, the first semiconductor switching module being configured to selectively allow current flow from the first battery to the load and from the load to the first battery;
arranging a second semiconductor switching module in series with the second battery, the second semiconductor switching module being configured to selectively allow current flow from the second battery to the load and from the load to the second battery;
storing charge data corresponding to respective charges of the first battery and the second battery;
storing usage data corresponding to respective ones of the first battery and the second battery, the usage data including at least one of past usage states and subsequent usage states of at least one of the first battery and the second battery; and
selectively turning on and off the first semiconductor switching module and the second semiconductor switching module based on the charge data; and
selectively turning on and off the first semiconductor switching module and the second semiconductor switching module based on the usage data.

11. The method of claim 10, wherein:
the charge data includes at least one of a lowest charge of the respective charges of the first battery and the second battery, a highest charge of the respective charges of the first battery and the second battery, and an average of the respective charges of the first battery and the second battery.

12. The method of claim 11, further comprising:
in a charge state, turning on the first semiconductor switching module to charge the first battery before turning on the second semiconductor switching module if the first battery has the lowest charge.

13. The battery pack of claim 12, further comprising:
in the charge state, turning off the first semiconductor switching module and turning on the second semiconductor switching module to charge the second battery if the charge of the first battery increases to a predetermined amount greater than the charge of the second battery.

14. The method of claim 11, further comprising:
in a discharge state, turning on the first semiconductor switching module to provide power to the load from the first battery before turning on the second semiconductor switching module if the first battery has the highest charge.

15. The method of claim 14, further comprising:
in the discharge state, turning off the first semiconductor switching module and turns on the second semiconductor switching module to provide power to the load from the second battery if the charge of the first battery decreases below a predetermined threshold.

16. The method of claim 10, wherein:
the usage data includes at least one of i) a number of times the first battery was used in a pre-charge state, ii) a number of times the second battery was used in the pre-charge state, iii) which of the first battery and the second battery to use in a next pre-charge state, iv) which of the first battery and the second battery not to use in the next pre-charge state, v) a number of times the first battery was used first in a discharge state, vi) a number of times the second battery was used first in the discharge state, vii) which of the first battery and the second battery to use first in a next discharge state, and viii) which of the first battery and the second battery not to use in the next discharge state.

17. The method of claim 16, further comprising:
transitioning one of the first semiconductor switching module and the second semiconductor switching module to the pre-charge state based on the usage data.

18. The method of claim 16, further comprising:
in the discharge state, turning on the first semiconductor switching module to provide power to the load from the first battery before turning on the second semiconductor switching module based on the usage data.

* * * * *